United States Patent
Youngwerth et al.

(10) Patent No.: US 12,447,632 B2
(45) Date of Patent: Oct. 21, 2025

(54) ROBOTIC GRIPPING SYSTEM

(71) Applicant: VERSABUILT, INC., Boise, ID (US)

(72) Inventors: Albert James Youngwerth, Boise, ID (US); Alexander D. Youngwerth, Boise, ID (US); Benjamin Thomas Blaine, Boise, ID (US)

(73) Assignee: VersaBuilt, Inc., Boise, ID (US)

( * ) Notice: Subject to any disclaimer, the term of this patent is extended or adjusted under 35 U.S.C. 154(b) by 904 days.

(21) Appl. No.: 17/753,396

(22) PCT Filed: Sep. 4, 2020

(86) PCT No.: PCT/US2020/049579
§ 371 (c)(1),
(2) Date: Mar. 2, 2022

(87) PCT Pub. No.: WO2021/046479
PCT Pub. Date: Mar. 11, 2021

(65) Prior Publication Data
US 2022/0297315 A1    Sep. 22, 2022

Related U.S. Application Data

(60) Provisional application No. 62/896,644, filed on Sep. 6, 2019.

(51) Int. Cl.
*B25J 15/02*  (2006.01)
*B25J 15/04*  (2006.01)
*B25J 15/08*  (2006.01)

(52) U.S. Cl.
CPC ....... *B25J 15/0475* (2013.01); *B25J 15/0253* (2013.01); *B25J 15/08* (2013.01)

(58) Field of Classification Search
CPC .... B25J 15/0475; B25J 15/08; B25J 15/0253; B25J 15/0433; B25J 15/0066; B25J 15/0038
USPC ........................................ 294/86.4, 192, 213
See application file for complete search history.

(56) References Cited

U.S. PATENT DOCUMENTS

| | | | |
|---|---|---|---|
| 4,852,242 A * | 8/1989 | Tella | B25J 15/0491 901/41 |
| 5,360,249 A | 11/1994 | Monforte et al. | |
| 9,656,395 B2 | 5/2017 | Youngwerth et al. | |
| 9,855,663 B1 * | 1/2018 | Strauss | B25J 15/0408 |

(Continued)

FOREIGN PATENT DOCUMENTS

| | | |
|---|---|---|
| CN | 106553003 A | 4/2017 |
| JP | H05038691 A | 2/1993 |
| JP | 2010214510 A | 9/2010 |

OTHER PUBLICATIONS

International Search Report and Written Opinion for International PCT Application No. PCT/US2020/049579, mailed Dec. 15, 2020, 12 pages.

*Primary Examiner* — Paul T Chin
(74) *Attorney, Agent, or Firm* — Foster Garvey P.C.

(57) ABSTRACT

Disclosed are mechanical interfaces of an end-of-arm-tool (EOAT) and part-gripping devices. The EOAT mechanical interface is for operatively coupling a gripper actuator to the part-gripping device. The part-gripping device mechanical interface is matable to the EOAT mechanical interface for operatively coupling the EOAT to the part-gripping device. Among other improvements, also disclosed are improved gripper fingers.

23 Claims, 16 Drawing Sheets

(56) References Cited

U.S. PATENT DOCUMENTS

| | | | |
|---|---|---|---|
| 2020/0122340 A1* | 4/2020 | Bettaiah | B25J 15/0226 |
| 2022/0234219 A1* | 7/2022 | Volk | B25J 15/0475 |
| 2025/0136388 A1* | 5/2025 | Hwang | H01M 10/0404 |

* cited by examiner

ROBOTIC GRIPPING SYSTEM

RELATED APPLICATION

This application is a National Stage of International Application No. PCT/US2020/049579, filed Sep. 4, 2020, which claims priority benefit of U.S. Provisional Patent Application No. 62/896,644, filed Sep. 6, 2019, both of which are hereby incorporated by reference in their entireties.

TECHNICAL FIELD

This disclosure relates to robotic gripping systems and, more particularly, to an end of arm tool (EOAT) mountable to a robotic arm for establishing a mechanical coupling between the arm and a robotic part gripper in the form of a set of part-gripping fingers or a set of jaws that are shared with a CNC vise (e.g., service as vise jaws to hold the part in an operation area).

BACKGROUND INFORMATION

An example of a robotic gripping system is described in U.S. Pat. No. 9,656,395 of Youngwerth et al. The '395 patent describes techniques for sharing a set of jaws between a robotic machine-tending arm and a CNC vise. Thus, a robotic machine-tending system can be rapidly configured to process a wide variety of part types, automatically change tooling for both the robot and processing machine (i.e., depending on the part shape to be held), and perform a transfer between first and second operations without a regrip step. These capabilities reduce costs of introducing a new part to the system for tending, lower time and cost to set up each part to be tended, and provide an ability to process a part through multiple operations. Technology described in the '395 patent is also known commercially as MultiGrip™ technology, which is available from the applicant of the present patent application: VersaBuilt, Inc. of Boise, Idaho.

An embodiment of an EOAT and jaws described in the '395 include pairs of forks on the EOAT that fit within corresponding apertures of the jaws. The jaws may be retained on the EOAT while a clamping force is applied via the forks. If the EOAT is opened, however, then there may be insufficient friction between the forks of the EOAT and the apertures of the jaws to retain the jaws on the EOAT. Accordingly, the jaws may slip or fall off the EOAT due to gravity.

Likewise, the pair of forks and apertures described in the '395 patent have a relatively long length and wide spacing such that the jaws are relatively bulky. The bulk is suitable for some applications because a recessed central, cylindrical (i.e., bulky) portion of the jaws acts as a datum to confront a flat side of a workpiece. In other applications, however, the embodiments of the EOAT described in the '395 patent are not readily capable of coupling with part-gripping fingers, which are sometimes too narrow to accommodate long, spaced-apart apertures.

SUMMARY OF THE DISCLOSURE

Disclosed is an EOAT that can hold jaws in any orientation, in a clamped or unclamped state, such that sharable jaws are retained by the EOAT over the forces of gravity and normal acceleration by a robot.

In some embodiments, the disclosed EOAT has a compact, low-profile design. In other words, it does not extend relatively deep into the tool that is being carried by the robotic arm via the EOAT. Accordingly, these embodiments are capable of engaging and releasing either the aforementioned shared jaws or a part-gripping jaw having fingers configured to pick parts but not sharable with a vise.

In other embodiments, this disclosure describes techniques for storing jaws on low cost jaw holders, which allow a robot to engage and disengage jaws from the jaw holders. In some other embodiments, jaws can be engaged or disengaged to the EOAT, vise, or jaw holders by a person.

A disclosed apparatus includes an EOAT including an interface for engaging and disengaging jaws, jaw holders configured to hold jaws, and a vise including an interface for engaging and disengaging jaws. Jaws may be configured as part gripping jaws that can be engaged by the EOAT, jaw holder or vise or jaws may be configured as part gripping jaws with fingers that can be engaged with the EOAT or jaw holder.

The EOAT can be configured using commonly available grippers such as the Schunk DPG-plus 100 with novel EOAT gripper fingers. The EOAT gripper fingers include an EOAT interface allowing the EOAT to engage and disengage part gripping jaws and part gripping jaws with fingers.

The vise can be configured using commonly available vises such as the Schunk KSP-160 plus vise. The vise includes two jaws configured with a jaw engagement profiles. The jaw engagement profiles allow the vise to secure the part gripping jaws and optionally a part in the part gripping jaws when the vise is clamped. The vise is configured to rigidly and securely clamp the part gripping jaws and part for processing in a machine.

The part gripping jaws include a first side with an EOAT interface and a second side with a vise interface. The part gripping jaws are coupled together using cross pins, circlips and springs. The part gripping jaws can be configured for OD (outer diameter) clamping or ID (inner diameter) clamping. The springs and circlips are configured to normally push the OD part gripping jaws away from one another and to push the ID part gripping jaws towards one another. The spring force is beneficial to secure the jaws when the jaws are placed on the jaw holder or engaged with the EOAT when there is no clamping force.

The part gripping jaws with fingers are configured similarly to the part gripping jaws and include a first side with an EOAT interface and a second side with an abbreviated vise interface that is configured to be gripped by the jaw holder. The part gripping jaws with fingers include fingers configured to grip and release a part. The fingers are configured to be adjustable in width to handle a wide range of part sizes. The fingers are also configured with finger-tip mounting holes that are configured to accept custom finger-tips for better gripping a wide variety of part shapes. Like the part gripping jaws, the part gripping jaws with fingers are coupled together using cross pins, circlips and springs and can be configured for OD (outer diameter) clamping or ID (inner diameter) clamping and the springs and circlips are configured to normally push the OD part gripping jaws with fingers away from one another and to push the ID part gripping jaws with fingers towards one another.

The jaw holder includes a jaw engagement profile similar to the vise jaw engagement profile. The jaw engagement profile is configured such that the spring force of the part gripping jaws secures the part gripping jaws or part gripping jaws with fingers onto the jaw holder.

Additional aspects and advantages will be apparent from the following detailed description of embodiments, which proceeds with reference to the accompanying drawings.

DETAILED DESCRIPTION OF EMBODIMENTS

Figure 1:
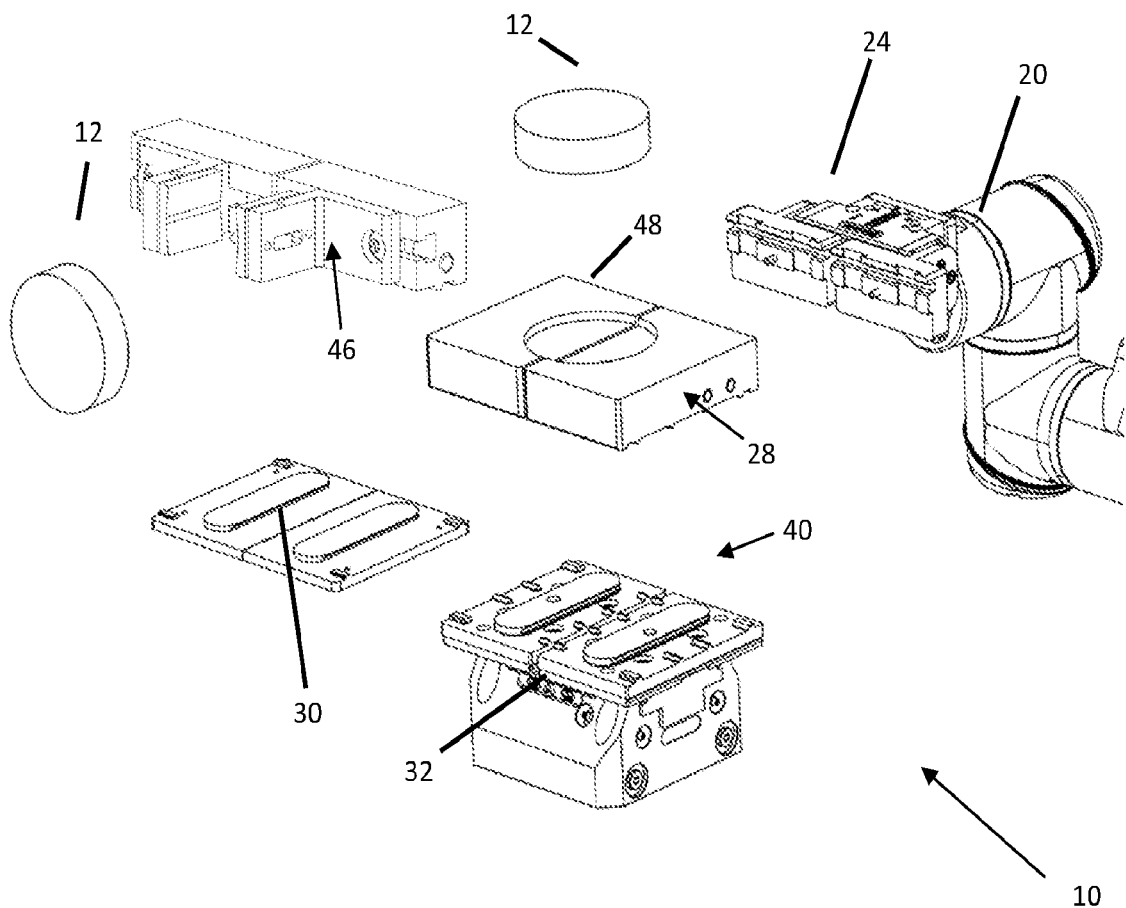
FIG. 1 is an isometric view of components of a robotic gripping system.

FIG. 1 shows a robotic gripping system 10 for moving a workpiece 12, according to two embodiments.

In a first embodiment, robotic gripping system 10 includes a robot arm 20, an EOAT 24 mounted to robot arm 20, a set of jaws 28 (or simply, jaws 28) for gripping workpiece 12, an optional jaw holder 30 atop which jaws 28 are stowed, and a vise 32. Jaws 28 are sharable between arm 20 and vise 32 because they include mechanical coupling interfaces on two perpendicular sides of jaws 28. For example, a first interface 36 (FIG. 4, e.g., ridges and dovetails) is for robotically mounting and moving jaws 28 atop intermediate jaws 40 on vise 32, as described in the '395 patent. A second, low-profile interface 42 (FIG. 3) is for EOAT 24 and is a subject of subsequent paragraphs in this disclosure.

In a second embodiment, a set of part-gripping fingers 46 (or simply, fingers 46) are included as a substitute for, or in addition to, jaws 28.

Jaws 28 and fingers 46 provide for different part-gripping orientations relative to a grip axis. For example, jaws 28 grip workpiece 12 in a first orientation relative to a grip axis of jaws 28 whereas fingers 46 grip workpiece 12 in a second orientation (different from the first orientation) relative to a grip axis of fingers 46. Specifically, in the first orientation, opposing first and second flat sides of workpiece 12 are, respectively, confronting and opposing a recessed datum 48 such that the flat sides are substantially parallel with a plane defined by datum 48. Conversely, fingers 46 grip workpiece 12 in a transverse orientation, according to one embodiment. Skilled persons will appreciate, however, that finger 46 may grip another workpiece in the aforementioned first orientation.

Another distinction between jaws and fingers is that, in some applications or workpiece processing operations that need not employ sharable jaws, fingers 46 (i.e., non-shared jaws) are preferred. Accordingly, non-shared jaws need not include first interface 36 or may include a simplified interface suitable for stowing fingers 46 atop jaw holder 30. Some further applications may employ both shared and non-shared jaws, as contemplated in system 10 of FIG. 1.

Notwithstanding differences between jaws 28 and fingers 46, datum 48 of jaws 28 is optional and may instead by an aperture such that modified jaws more closely resemble fingers. Therefore, for conciseness, the term jaws is used synonymously with the term fingers, unless contexts makes clear that the pertinent passages refer exclusively to sharable jaws.

Figure 2:
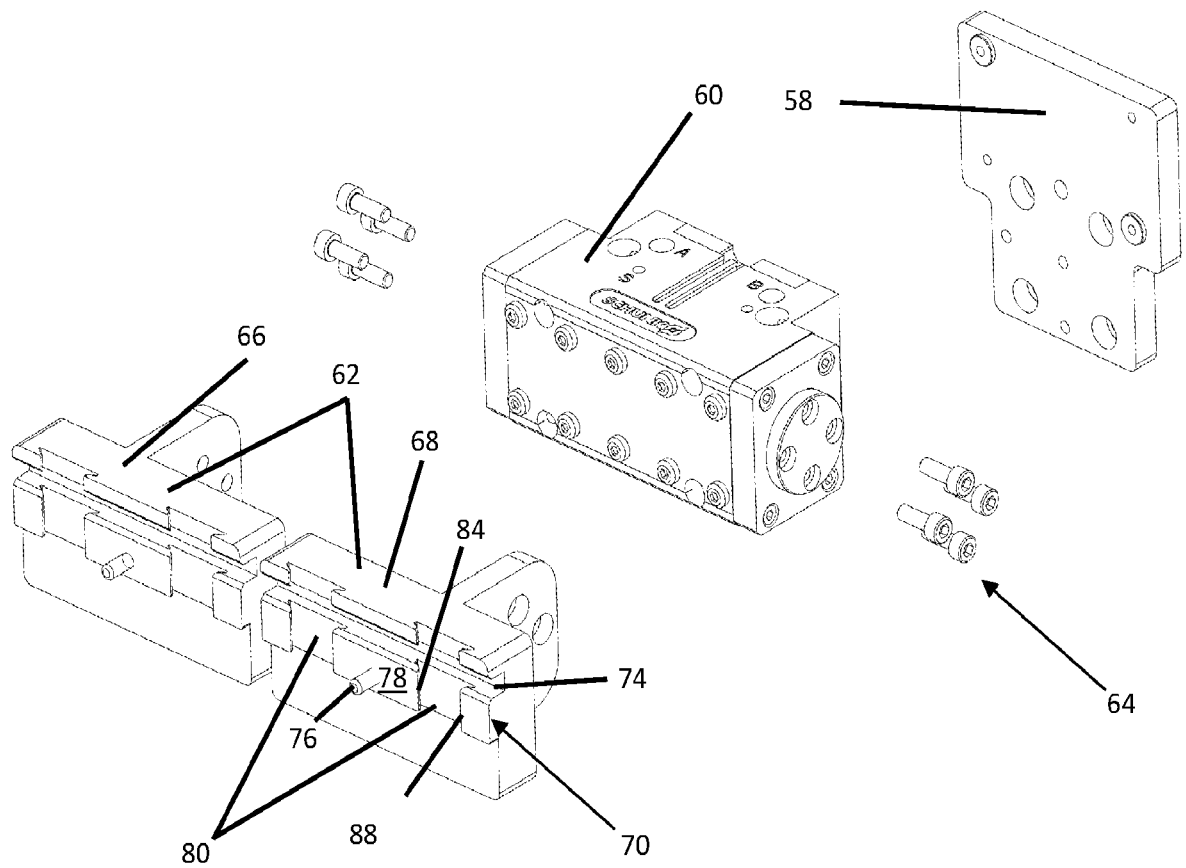
FIG. 2 is a partly exploded isometric view of an EOAT shown in FIG. 1.

FIG. 2 is a partly exploded view detailing components of EOAT 24. For example, EOAT 24 includes a mounting plate 58, gripper actuator 60, and a set of EOAT-to-gripper interface bodies 62 that are actuatable along a gripping axis. Bolts 64 attach bodies 62 to gripper actuator 60. Other bolts (not shown) attach mounting plate 58 to robot arm 20 and gripper actuator 60 to mounting plate 58.

Gripper actuator 60 is of a centering type of linear actuator. A Schunk DPG-plus 100 gripper actuator 60 is shown as an example in FIG. 2, but skilled persons will appreciate that any actuator capable of actuating interface bodies 62 (e.g., moving them toward and apart from each other) could be employed. For instance, in another embodiment (not shows), a gripper actuator 60 is of a single, side-actuating type of linear actuator incorporating two gripper fingers.

EOAT-to-gripper interface bodies 62 include a first body 66 and a second body 68, which are essentially mirror images of each other in the present embodiment. For conciseness, therefore, only jaw interface 70 of body 68 are described because identical features appear on body 66. As indicated in the preceding paragraph, other embodiments may include a single (i.e., non-centering) interface having no mirror-image counterpart.

Jaw interface 70 include a Z-locating pocket 74 in the form of a laterally extending channel that guides jaws 28 or fingers 46 into Z-axis (i.e., vertical) alignment, an alignment pin 76 projecting from a central contact surface pad 78, and spaced-apart female dovetails 80 to apply grip and release forces in an X-axis (along a gripping axis) direction. Each one of female dovetails 80 includes an ID dovetail edge 84 and an OD dovetail edge 88. Other shapes for joint, pin, and pocket are possible.

Skilled persons will appreciate that, in some embodiments, female dovetails 80 could be substituted with male dovetails. Also, such dovetails need not form a complete joint in the sense that the term "dovetail" might be understood for joinery techniques. Specifically, one side of a female dovetail need not contact a confronting joint surface, as explained in the gripping applications described below, so a complete joinery dovetail need not be formed. Accordingly, this disclosure adopts the generic term "lateral restraint dovetail joint surface" to generically refer to angled surfaces (male or female) of the types shown in the accompanying figures that are configured to slidably confront oppositely angled surfaces when a lateral grip force is applied such that the two supplementary angled surfaces act to pull inward toward each other in response to the sliding forces.

Figure 3:
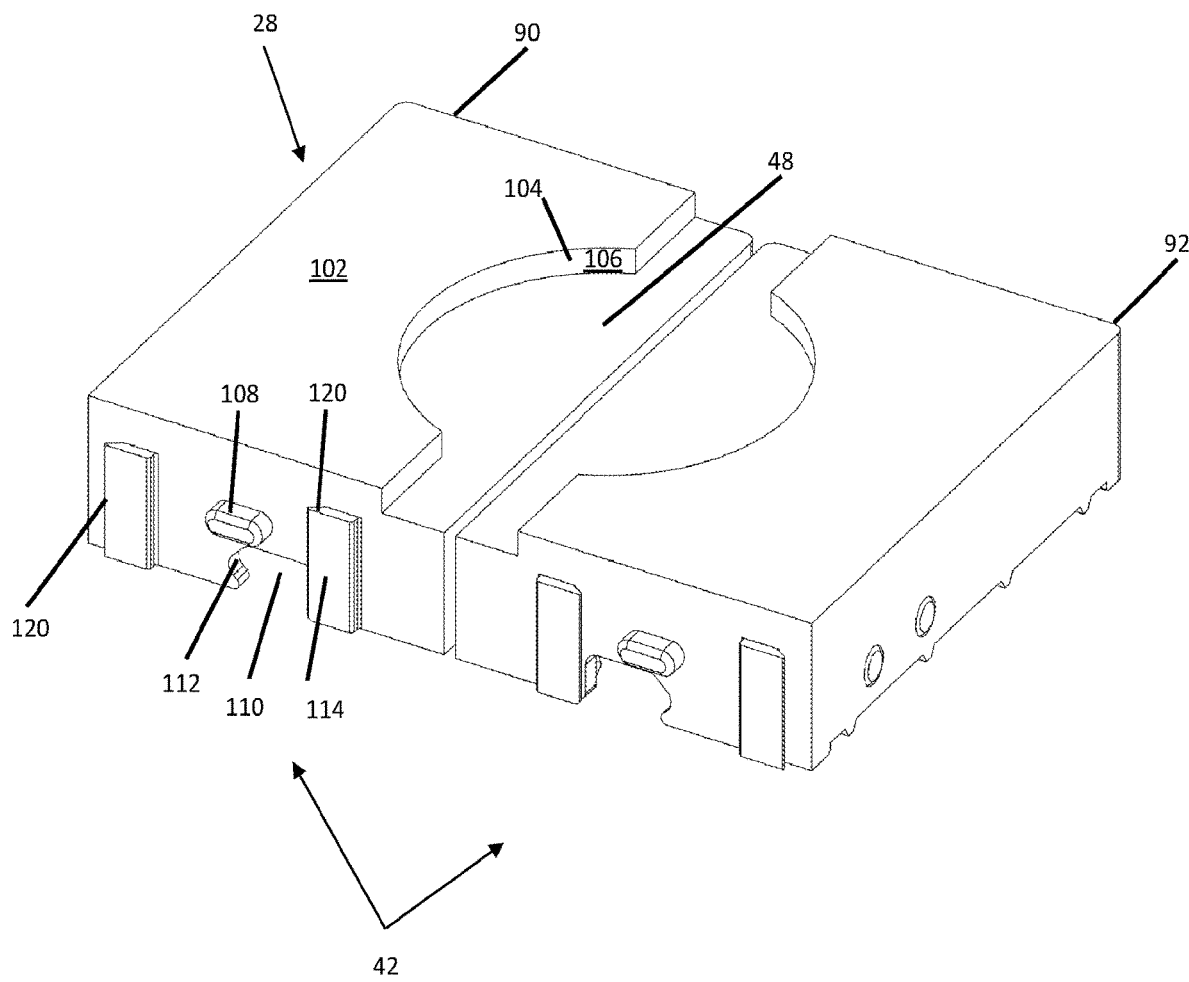
FIGS. 3 and 4 are, respectively, top and bottom isometric views of jaws shown in FIG. 1 that are configured for outside diameter (OD) clamping and gripping, these figures showing details of mechanical coupling interfaces.
Figure 4:
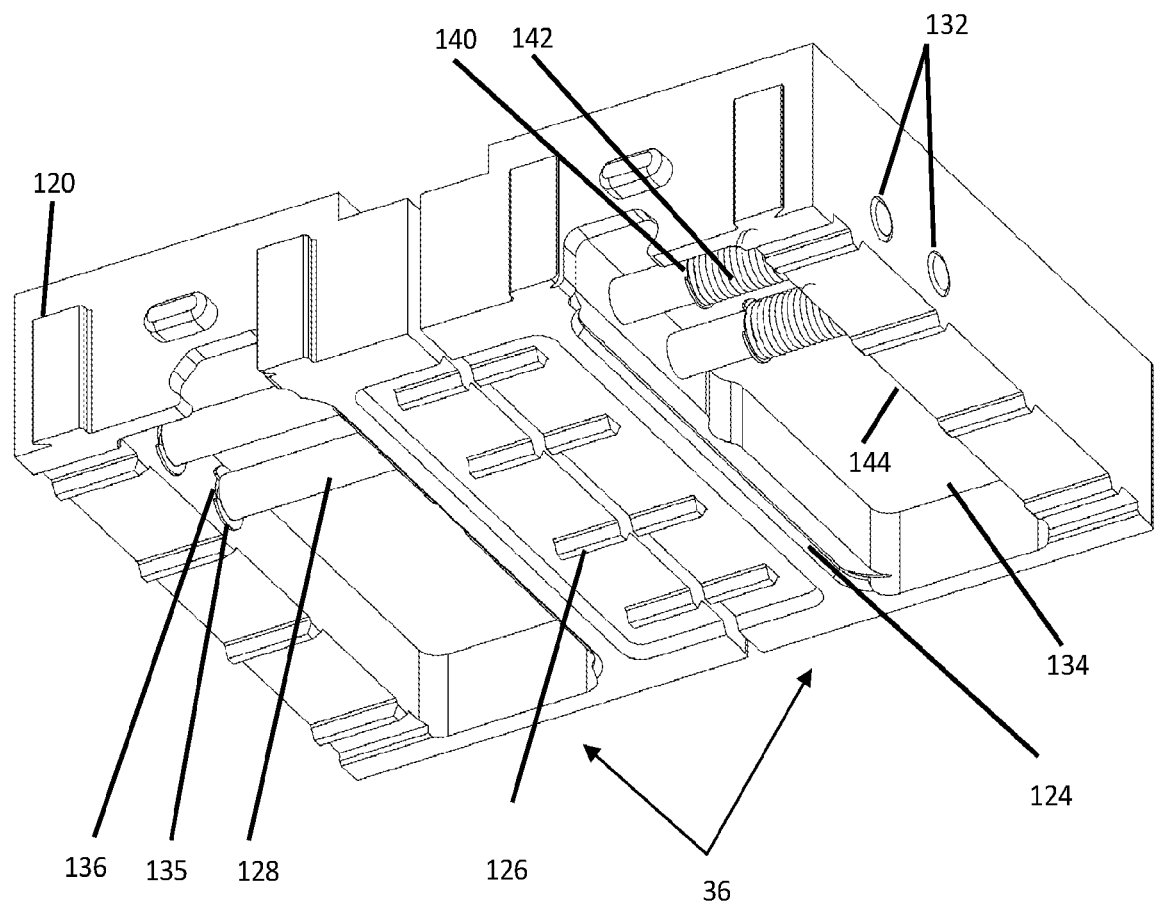

FIGS. 3 and 4 show jaws 28 in greater detail. Jaws 28 include a first jaw body 90 and a second jaw body 92, which are generally mirror images in FIG. 3. Accordingly, although the following description is of first jaw body 90, it applies to second jaw body 92.

As indicated previously, datum 48 is recessed in a surface 102. A sidewall 104 between datum 48 and surface 102 provides a part-gripping profile surface 106 to confront and engage a complementary OD surface profiled portion of workpiece 12 (FIG. 1) as a grip force is applied to jaws 28 via interface 42 or interface 36 (FIG. 4).

EOAT interface 42 of jaws 28 includes a Z-locating boss 108 sized to fit within Z-locating pocket 74 of jaw interface 70 (FIG. 2), an alignment window 110 for receiving pin 76 (FIG. 2) and defining a face 112 that catches pin 76. As shown and described later with reference to FIG. 14, alignment window 110 catches pin 76 to limit lateral expansion of first body 66 and second body 68 during EOAT 24 engagement of jaws 28, i.e., while coupling two spaced-apart male dovetails 114 sized to fit in corresponding female dovetails 80. Because jaws 28 are intended for OD clamping, male dovetails 114 each include an outward-facing OD edge 120 and need not include inward facing ID edges (c.f., edge 120 of FIG. 3 and edge 156 of FIG. 5).

Skilled persons will appreciate that locations of alignment pin 76 and alignment window 110 could be reversed such that an alignment pin is located on jaws 28 and an alignment window is located on EOAT interface 42. These terms are generically referred to as matable alignment structures. Likewise, Z-locating pocket 74 and Z-locating boss 108 are reversible. These terms are generically referred to as matable Z-locating structures FIG. 4 shows additional details of interface 36, which is a subject of the '395 patent. For example, intermediate-jaw dovetail edges 124 are sloped and complementary to surfaces of intermediate jaws 40 (FIG. 1), thereby acting as a Z-axis restraint and as a means to transfer clamping forces applied in an X-axis direction. Gear-like ridges 126 restrain Y-axis movement when mated with grooves of jaws 40. Additional details of interface 36 may be found in the '395 patent.

FIG. 4 also shows a spring-actuated tensioner that applies a spring force to jaws 28 so as to maintain a securing force to edges 120 (i.e., to keep jaws 28 secured on EOAT 24) or to intermediate-jaw dovetail edges 124 (i.e., to keep jaws 28 secured on intermediate jaws 40, FIG. 1).

Cross pins 128 are passed through cross pin holes 132 and through cross pin pocket 134 to establish guide rails by which jaws 28 move inward (e.g., for OD clamping) and outward (e.g., for OD clamp releasing). Circlips 135 fasten cross pins 128 into place at a cross pin fixed groove 136. Cross pin spring grooves 140 and springs 142 provide the aforementioned spring force, which is applied against an outer wall 144 of a cross pin pocket 134; forcing the jaws apart.

The arrangement of springs 142 can be modified for ID clamping applications such that the spring force (i.e., force applied against dovetail edges) remains opposite from an applied clamping force; forcing the jaws together. Thus, as clamping force is released, spring force begin to exceed clamping force so that jaws (or fingers) do not slip free from the vise or EOAT interface. Similarly, spring force is not so great as to frustrate an ability to securely clamp a workpiece.

Figure 5:
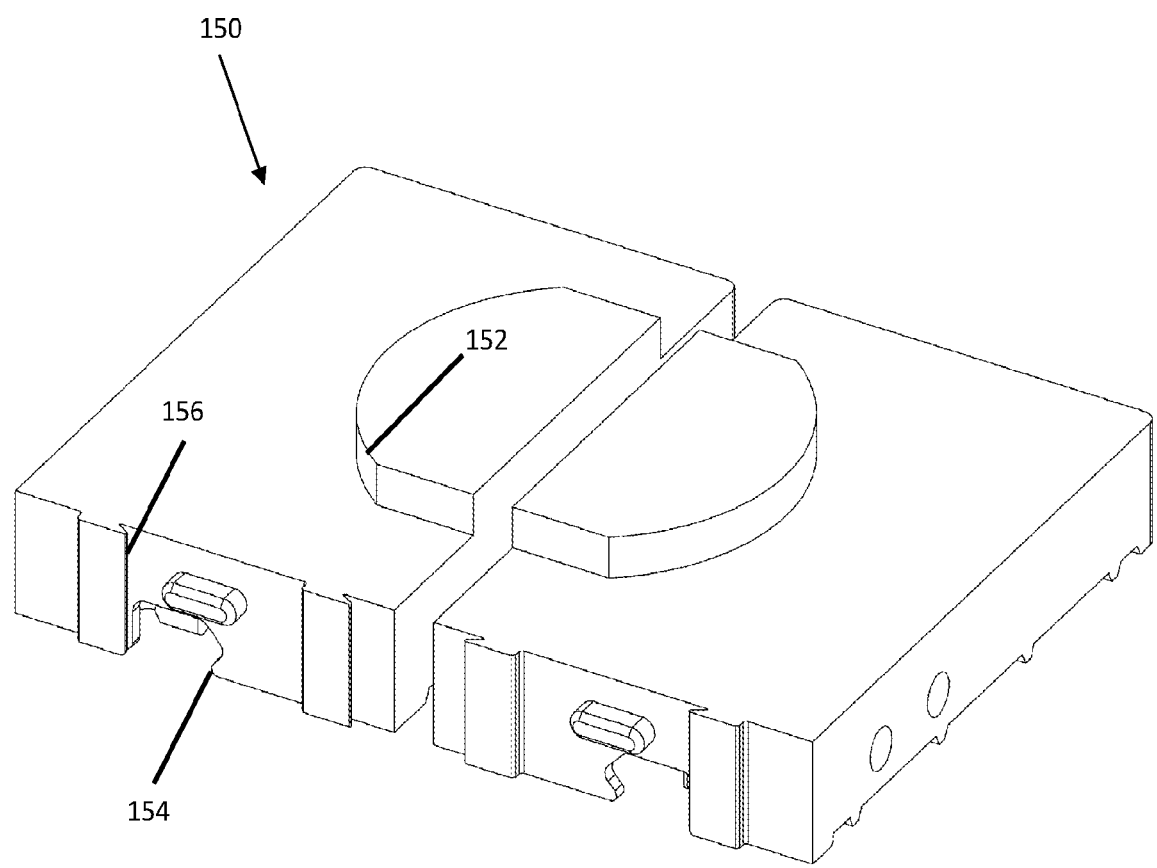
FIGS. 5 and 6 are, respectively, top isometric and bottom plan views of another set of jaws like that shown in FIG. 1 but configured for inside diameter (ID) clamping and gripping.
Figure 6:
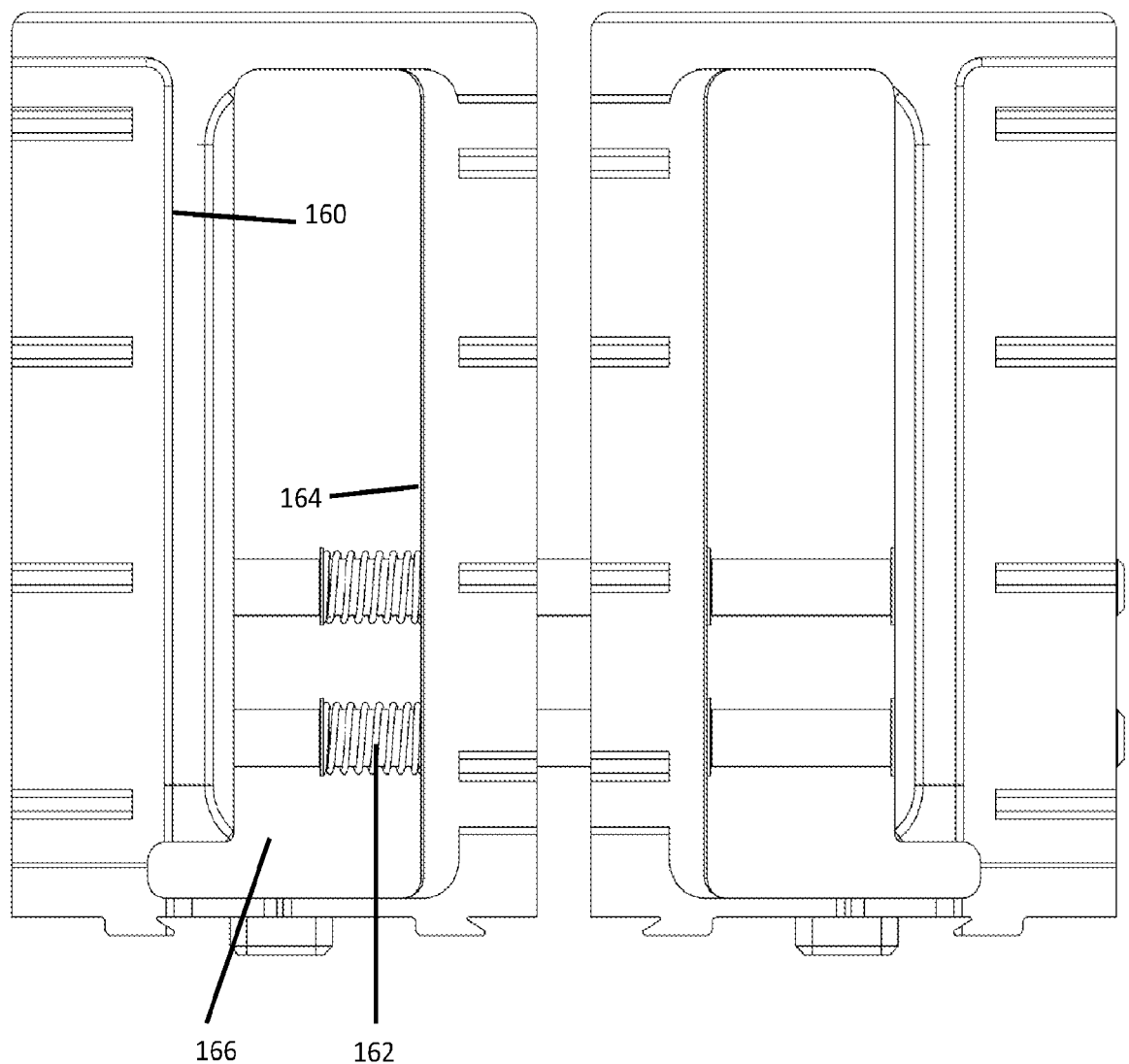

FIGS. 5 and 6 show another set of jaw 150, which is similar to jaws 28. A difference, however, is that jaws 150 are for an ID clamping application. Thus, instead of including a recessed datum, jaws 150 include a raised part-gripping profile 152. Also, because clamping force acts to separate jaws, faces 154, dovetail edges 156, and vise edges 160 (FIG. 6) all face in an opposite direction compared to that of the corresponding components of jaws 28. Furthermore, springs 162 are also configured to apply spring force to an inside surface 164 of cross pin pocket 166; forcing the jaws together.

Figure 7:
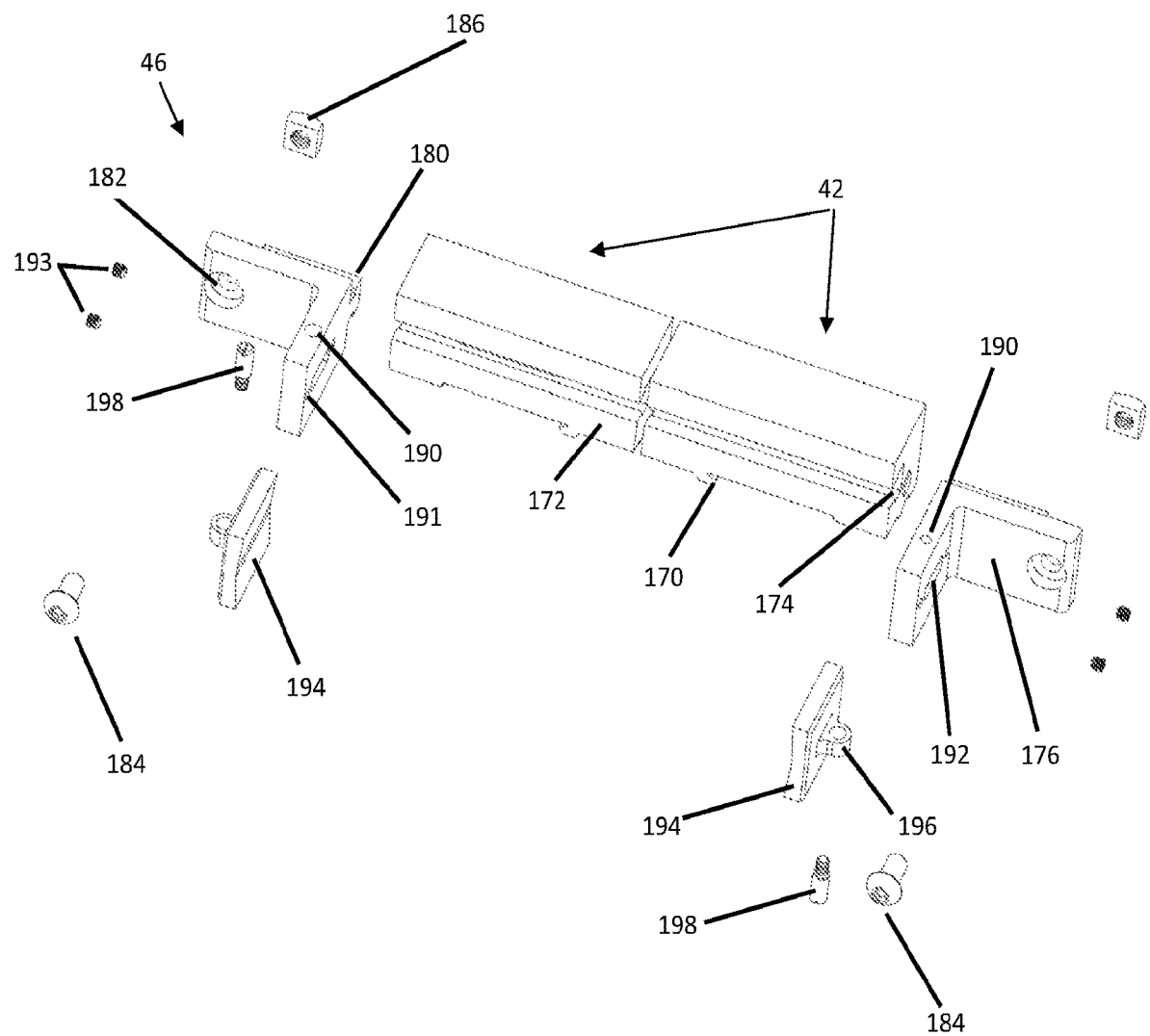
FIGS. 7 and 8 are, respectively, partly exploded isometric and bottom plan views of fingers configured for OD clamping.
Figure 8:
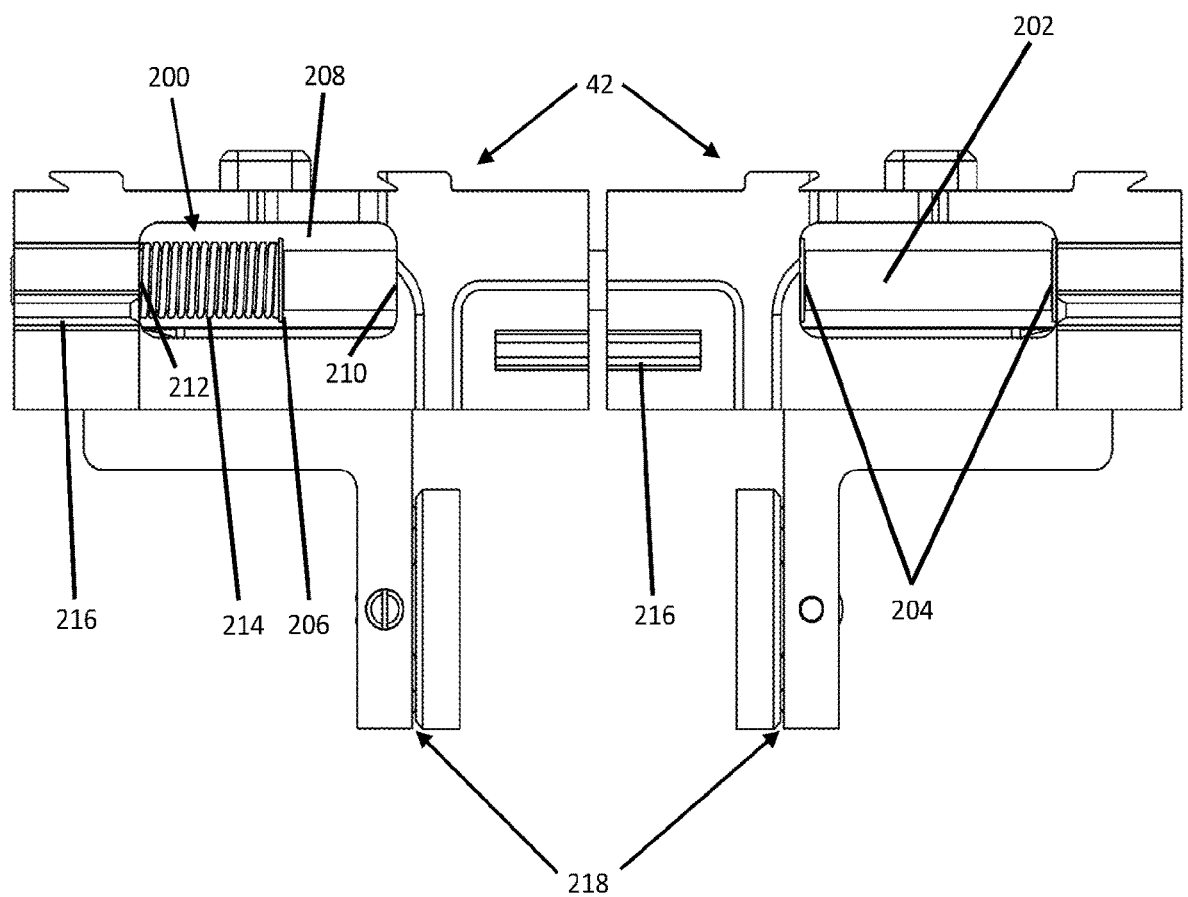

FIGS. 7 and 8 show fingers 46 in greater detail. In general, fingers 46 are configured similarly to jaws 28 in that both embodiments include a similar interface 42, but fingers 46 have a streamlined version of interface 36 (see e.g., FIG. 8) suitable for stowing fingers 46 on holder 30 (FIG. 1). For example, fingers 46 includes a relatively short OD vise dovetail 170 and a ridge 216.

Fingers 46 also include an inner face 172 having a t-slot groove 174 configured to accept adjustable finger segments 176, which are generally symmetrical in the present embodiment. Each one of segments 176 includes a male-T connector 180 (which may be female when reversed), a bolt hole 182 configured to accept a set bolt 184 and nut 186. Nut 186 is configured to slide into t-slot groove 174 so that adjustable finger segments 176 can be adjusted into position and then locked into place by securing bolt 184 against nut 186. Adjustable finger segments 176 are configured with a fingertip mounting slot 192 and a fingertip mounting aperture 190 for securing fingertips 194. Fingertips 194 include a boss with receptacle 196 that is configured to mate into fingertip mounting slots 192 and align boss with receptacle 196 with fingertip mounting aperture 190. One side of fingertip mounting aperture 190 is configured as a clearance hole for a shoulder bolt 198 and the other end of the fingertip mounting aperture 190 is threaded to accept shoulder bolt 198 threads; fingertip mounting slot 192 acting as the mating surface for the shoulder of shoulder bolt 198.

The relationship between the boss with receptacle 196 and fingertip mounting slot 192 is configured to create a small gap 218 between fingertips 194 and adjustable finger segments 176 that allows fingertips 194 to rock back and forth a small amount. Allowing one or both of fingertips 194 to rock back and forth allows fingers 46 to accommodate some flex in fingers 46 and parts that are not perfectly parallel. Fingertip leveling holes 191 accept optional set screws 193, allowing set screws 193 to be adjusted into contact with fingertips 194 limiting the fingertip rocking travel or locking fingertips 194 into an angle with respect to adjustable finger segments 176.

FIG. 8 shows a spring tensioner 200 that is a streamlined variant of that shown in FIG. 4. Tensioner 200 includes a single cross pin 202, cross pin fixed grooves 204, cross pin spring groove 206, circlips (not shown), cross pin holes (not shown), cross pin pocket 208, inside pocket wall 210, outside pocket wall 212, and spring 214.

ID part gripping jaws with fingers (not shown) are similar to the OD part gripping jaws with fingers 46 except for having the same changes that ID part gripping jaws 150 have vis-à-vis OD part gripping jaws 28 to configure the ID part gripping jaws with fingers for ID clamping.

FIGS. 9-16 show in succession how EOAT 24 engages jaws 28. In other words, these figures show how interfaces 42 and 70 are mated.

Figure 9:
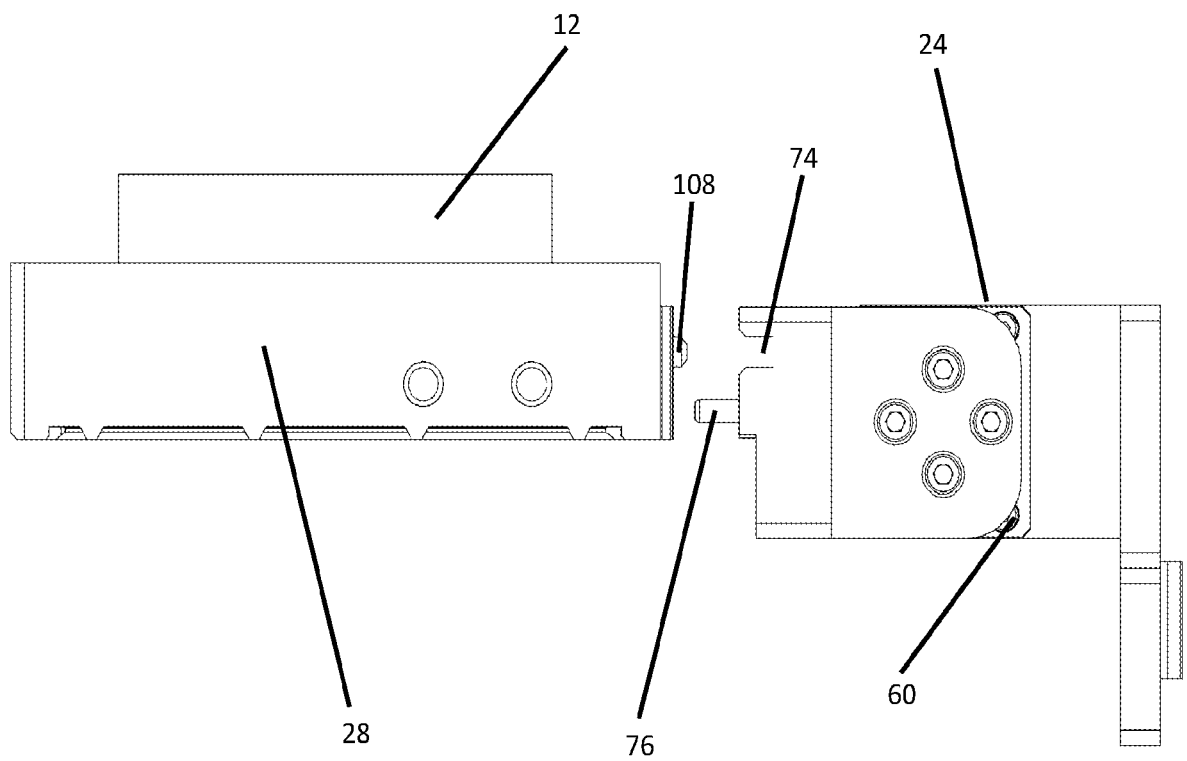
FIGS. 9 and 10 are, respectively, side elevation and bottom plan views showing the EOAT approaching the jaws.
Figure 10:
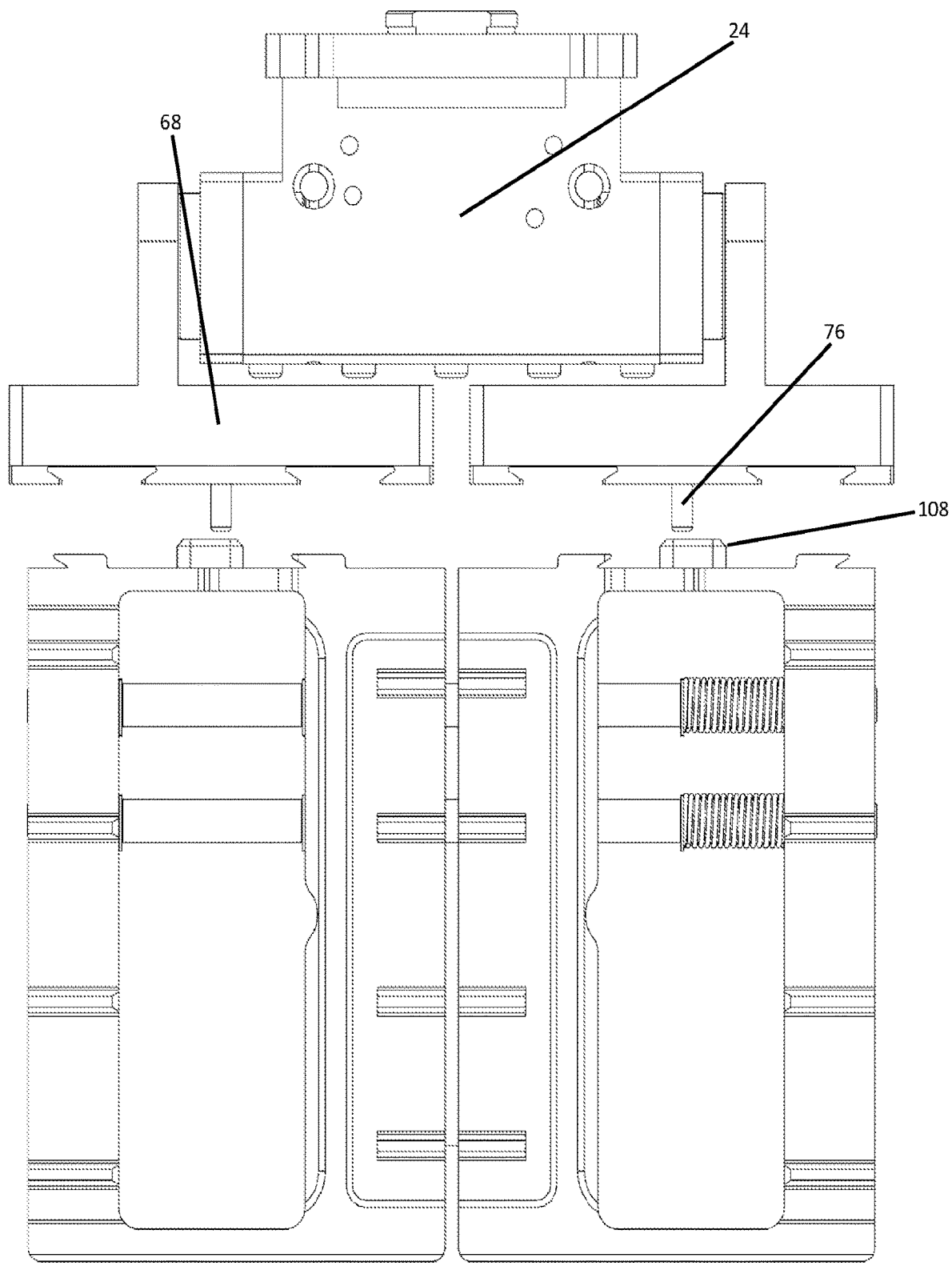

FIGS. 9 and 10 show how EOAT 24 initially approaches jaws 28 for engagement. Although not shown, jaws 28 could be held in position by jaw holder 30 or vise 32. Z-locating boss 108 is aligned for engagement with Z-locating pocket 74 when jaws 28 are interfaced to gripper actuator 60. Pin 76 is positioned to be inserted in window 110. Thus, the center of EOAT 24 is approximately aligned with the center of jaws 28 so that alignment pins 76 are positioned to penetrate alignment windows 110 (FIG. 3).

Figure 11:
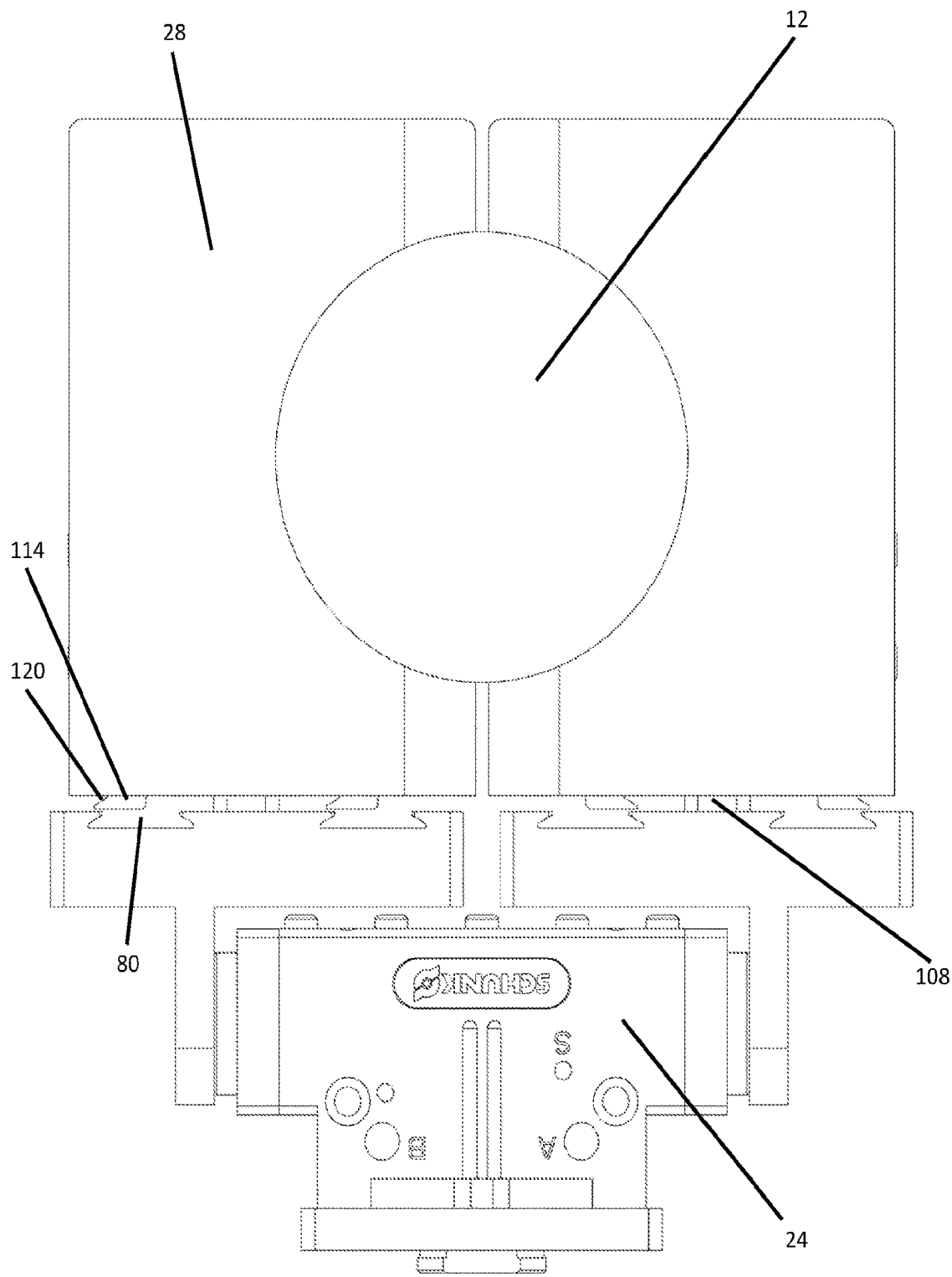
FIGS. 11 and 12 are, respectively, top and bottom plan views of the EOAT engaging the jaws in a first engagement step.
Figure 12:
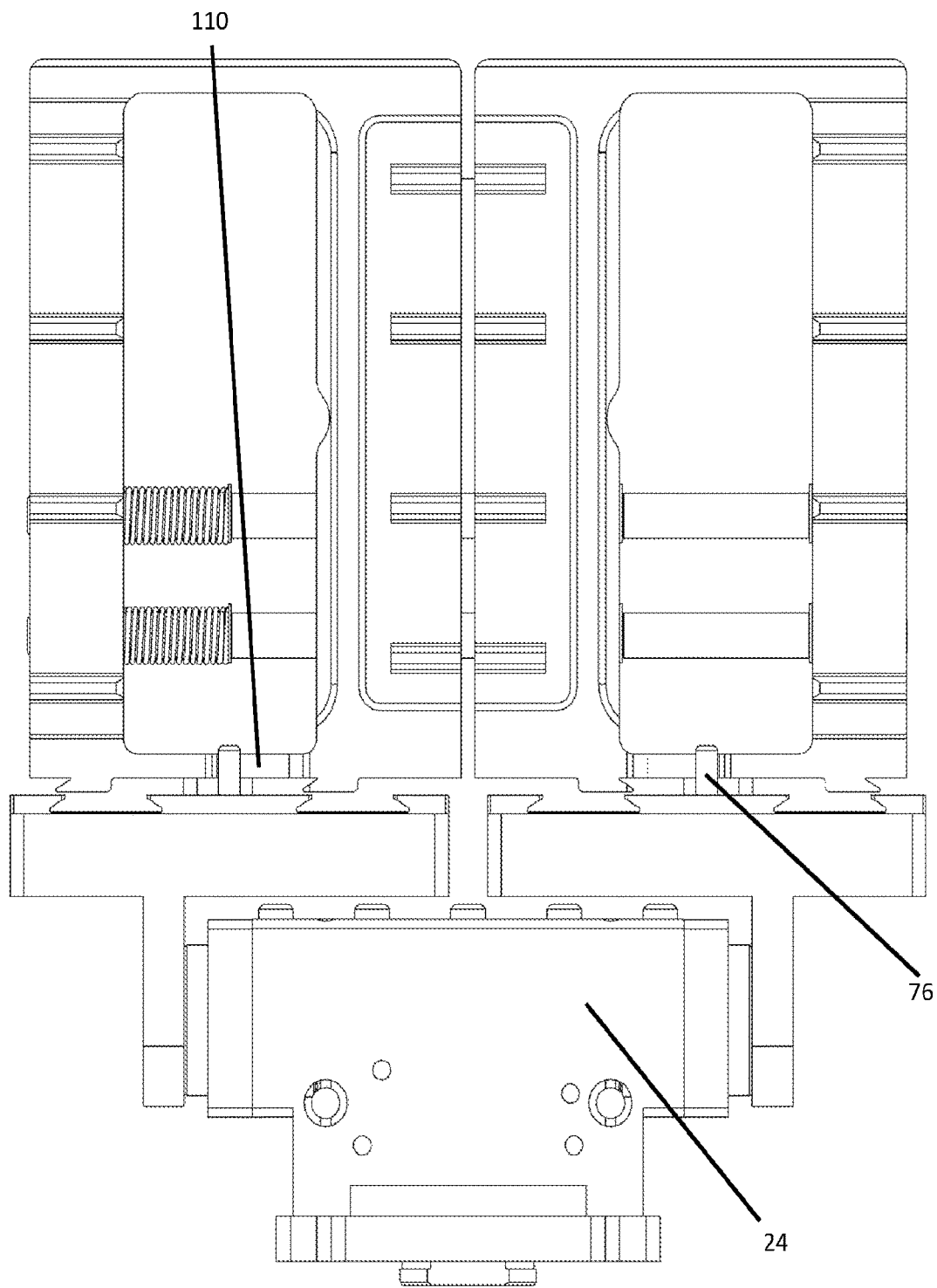

FIGS. 11 and 12 show a first engagement step. EOAT 24 is in a closed position, and Z-locating boss 108 is partially engaged with Z-locating pocket 74. Openings of female dovetails 80 are away from and edges 120 are misaligned with those of male dovetails 114 of jaws 28. FIG. 12 shows alignment pins 76 in alignment windows 110.

Figure 13:
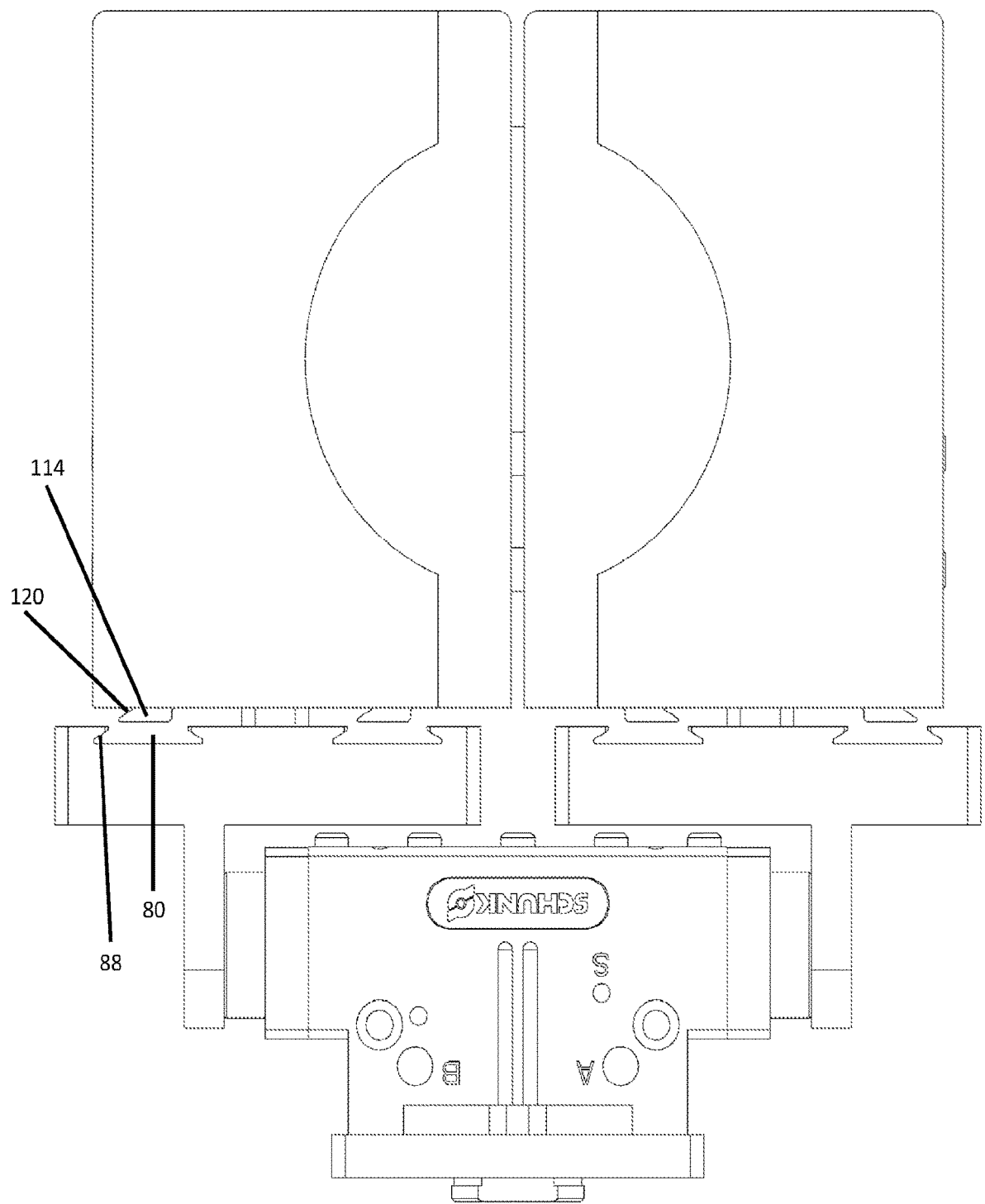
FIGS. 13 and 14 are, respectively, top and bottom plan views of the EOAT engaging the jaws in a second engagement step.
Figure 14:
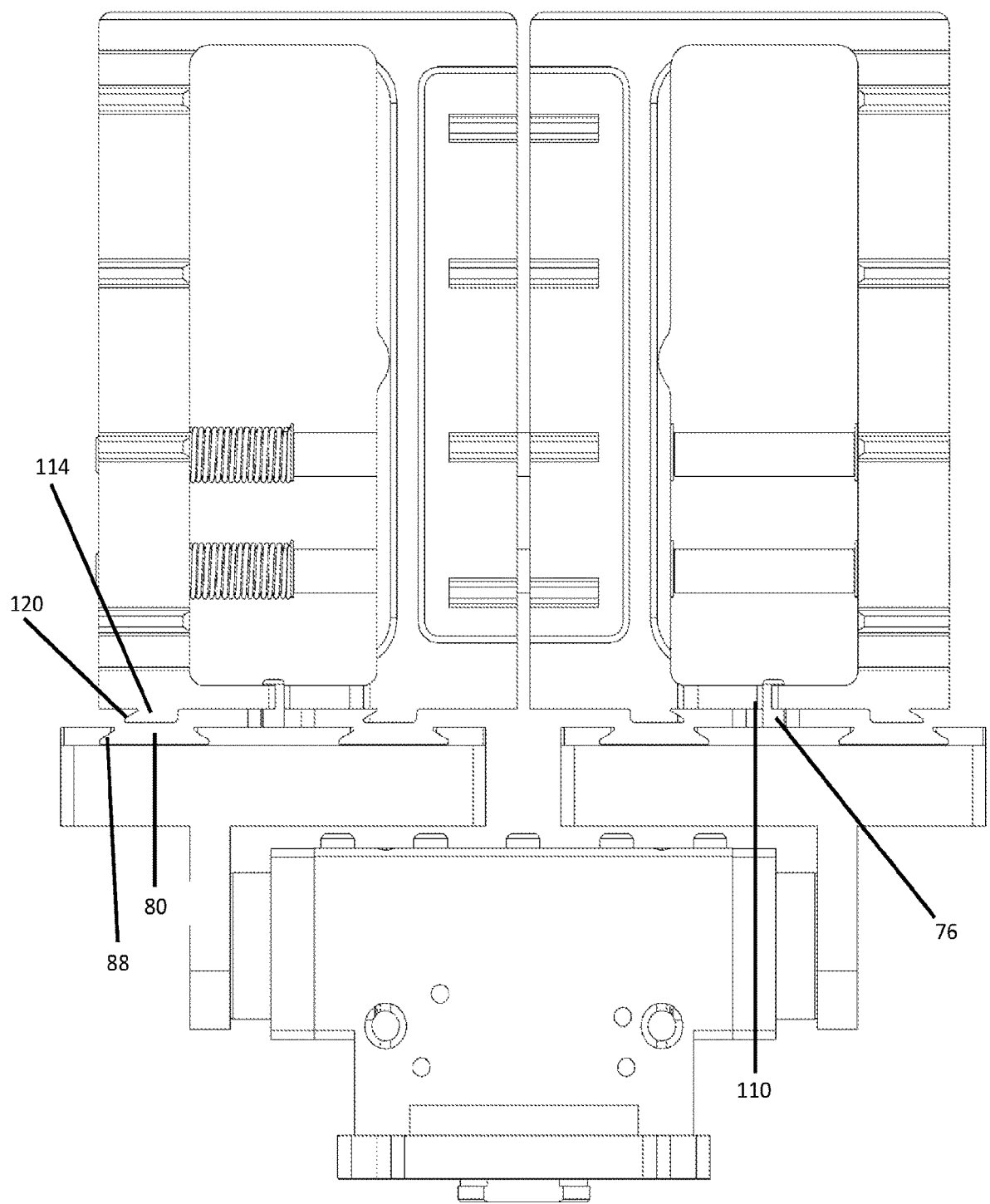

FIGS. 13 and 14 show a second engagement step. In this step, EOAT 24 has moved into partial engagement with jaw 28 and with Z-locating boss 108 partially engaged with Z-locating pocket 74. Thus, EOAT 24 has been signaled to open. In a partially open position, openings of female dovetails 80 are slightly away from and its edges 88 now aligned with edges 120 of male dovetails 114 of jaws 28.

FIG. 14 also shows alignment pins 76 engaged with alignment faces 112. In this step, when EOAT 24 is opened, alignment pins 76 contact corresponding faces 112 to limit the opening travel of EOAT 24. The position of alignment pins 76 and alignment faces 112 are configured such that when alignment pins 76 contacts alignment faces 112, male dovetails 114 become aligned and centered in openings of female dovetails 80.

Figure 15:
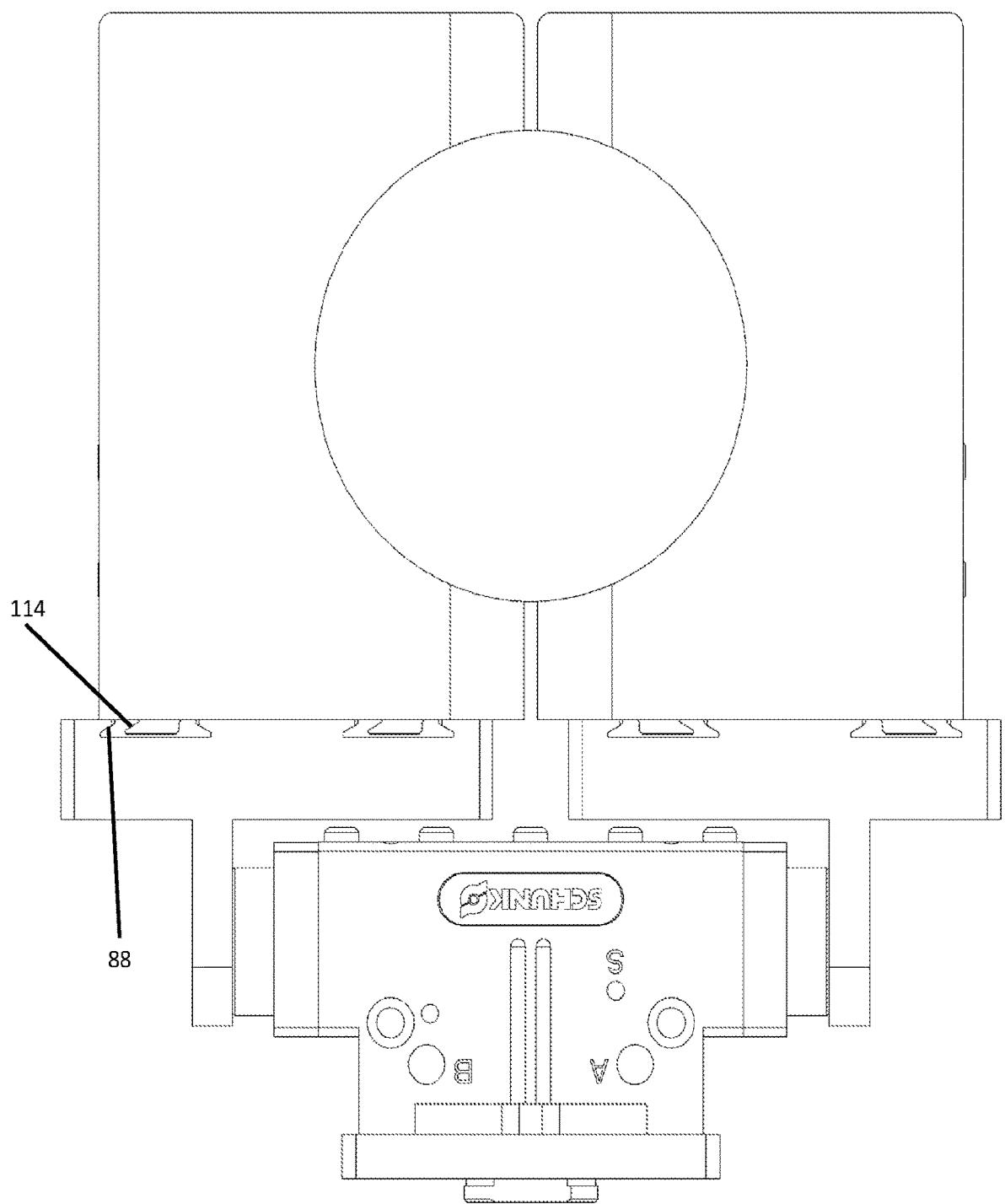
FIGS. 15 and 16 are top views showing the EOAT engaging the jaws in, respectively, third and fourth engagement steps.

FIG. 15 shows a third engagement step. EOAT 24 is in the partially open and aligned position and moved towards jaws 28 so that male dovetails 114 are inside of female dovetails 80. To reach this position, typically EOAT 24 would float (no opening force or closing force) to minimize friction between alignment pins 76 and alignment faces 112 as EOAT 24 is moved inwards towards jaws 28. Edges 88 clear and confront edges 120.

Figure 16:
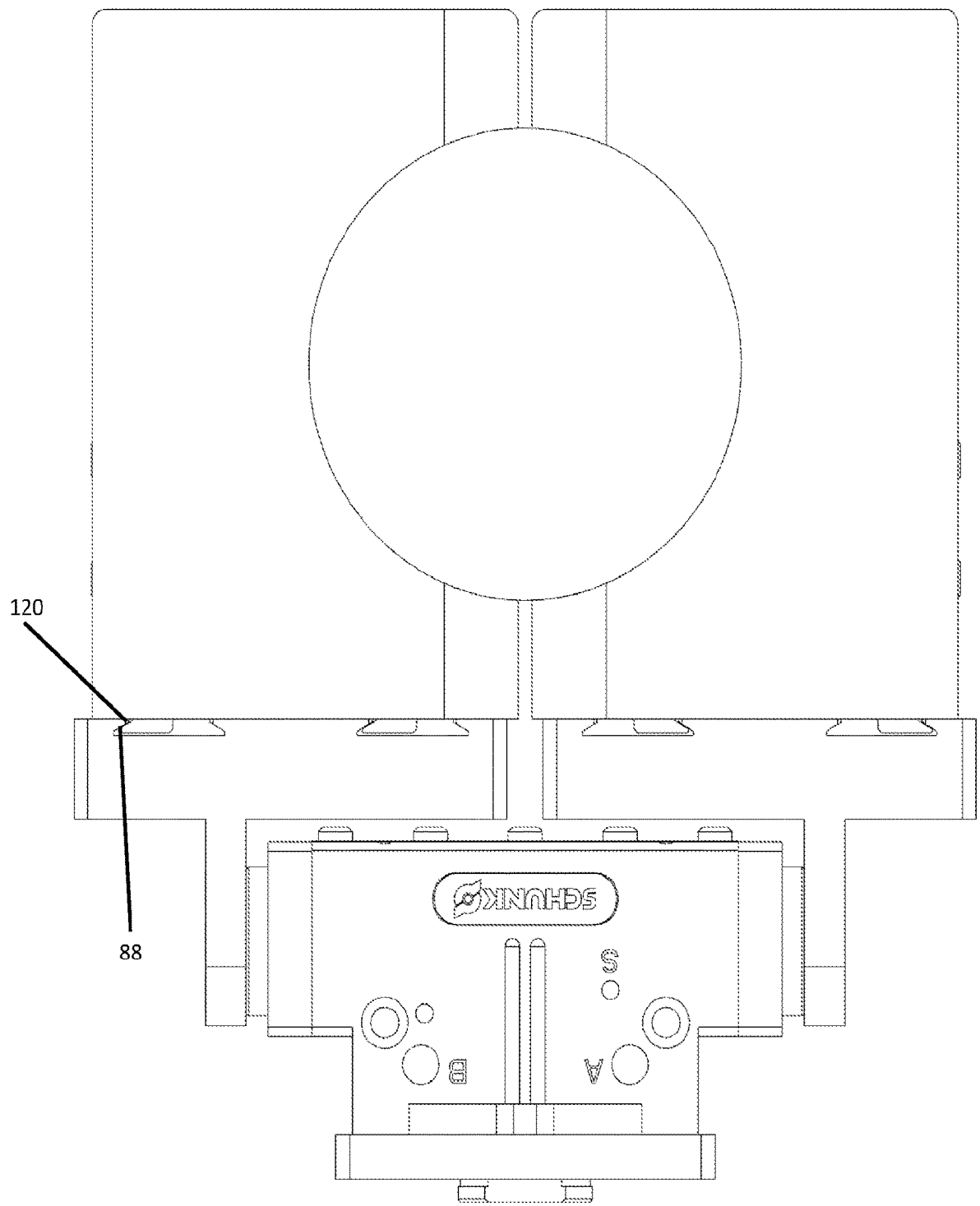

FIG. 16 shows a fourth engagement step. EOAT 24 is clamped towards the closed position and female dovetail edge 88 is engaged with the OD male dovetail edge 120 of the jaws 28. In this position, the OD female dovetail edge 88 is applying a force to OD male dovetail edge 120 of jaws 28, thereby urging jaws 28 together to provide a clamping force to hold workpiece 12.

Skilled persons will appreciate that the steps are similar for engaging jaws 28 mounted on vise 32, with the exception that in the fourth engagement step, after EOAT 24 is clamped in the closed position, vise 32 would be opened.

Skilled persons will also appreciate that with jaws 28 engaged in EOAT 24, even when EOAT 24 is in an unclamped state, spring force pushes male dovetail edge 120 into female dovetail edge 88 to secure jaws 28 with EOAT 24 while Z-locating boss 108 in Z-locating pocket 74 also prevent jaws 28 from sliding down along face of female dovetails 80. The force of springs 142 (FIG. 4) pushing male dovetail 114 into female dovetail 80 combined with Z-locating boss 108 and Z-locating pocket 74 secure jaws 28 in three axes to EOAT 24 under gravity loads and typical robot acceleration forces when EOAT 24 is in an unclamped state. This same principle applies to jaws 150 configured for ID clamping.

The steps entailed in disengaging jaws 28 from EOAT 24 and onto either a jaw holder 30 or vise 32 are as follows.

The first step is to position EOAT 24 with jaws 28 over jaw holder 30 or vise 32 such that ridges 126 of jaws 28 are aligned with those of jaw holder 30 or vise 32 with EOAT 24 in a closed or OD clamped position and if engaging vise 32, it is in the open position.

The second step would be to move jaws 28 down to engage alignment ridges 126 of jaws 28 with those of jaw holder 30 or vise 32.

If disengaging jaws 28 to vise 32, the third step is that vise 32 be closed, allowing vise OD dovetails to capture jaw OD dovetails 124. If disengaging jaws 28 to a jaw holder 30, the third step is skipped.

The fourth step is to open EOAT 24 opened. If engaging jaw holder 30, this step allows jaws 28 to open against force of springs 142 so that jaws OD vise dovetails 124 engage jaw holder 30 OD jaw dovetails. The opening of EOAT 24 allows the bodies 62 (FIG. 2) to open until alignment pins 76 come into contact with alignment faces 112 causing the opening of EOAT 24 female dovetails 80 to be aligned and centered with male dovetails 114.

The fifth step is to float EOAT 24 and then to move IT away from jaws 28.

The five steps mentioned above are similar for ID clamping of jaws 150 except that the movements of EOAT 24 and vise 32 from open to closed and from closed to open is opposite for jaws 150. For example, during engagement, at step two, EOAT 24 is sent a closing signal for jaws 150. As EOAT 24 closes, alignment pins 76 engage with alignment face 154 (FIG. 5) causing edges 84 (FIG. 2) to be aligned with edges 156. In step four, EOAT 24 is opened allowing ID female dovetail edges 84 to engage with the ID male dovetail edges 156.

A person may also engage or disengage by hand, jaws 28 onto EOAT 24, vise 32 or jaw holder 30. To engage jaws 28 configured for OD clamping with EOAT 24 or vise 32, vise 32 or EOAT 24 is put into the open position; to engage jaws 150 configured for ID clamping with EOAT 24 or vise 32, vise 32 or EOAT 24 is put into the closed position. Then, to engage jaws 8 configured for OD clamping with jaw holder 30 or vise 32, the person pushes jaws 28 closed and the places jaws 28 over jaw holder 30 or vise 32 so as to align and engage jaw holder 30 or vise 32 angled ridges with jaw 28 angled ridges 126 and then release jaws 28 so as to allow the force of the springs 142 to engage the OD vise dovetail with OD jaw dovetail 124. To disengage jaws 28 from jaw holder 30 or vise 32, the operator pushes jaws 28 closed and then lifts jaws 28 away from jaw holder 30 or vise 32.

Similarly, to engage jaws 28 with EOAT 24, the person pushes jaws 28 together until the male dovetails are aligned with the female dovetails, aligns Z boss with the Z locating pocket, pushes the jaws so that the male dovetail is inside the female dovetail and then allows the jaws to open allowing the spring force to secure the male dovetail into the female dovetail.

Hand engaging and disengaging ID jaws 150 is similar except ID jaws 150 are pulled apart to engage or disengage. To engage or disengage OD jaws 28 or ID jaws 150 on jaw holder 30 is similar to engaging or disengaging with vise 32 with the exception that there is no opening or closing of the vise step.

The steps for engaging and disengaging jaws 150 configured for ID clamping is similar except EOAT 24 or vise 32 begins in the closed position and jaws 150 are pulled apart to place over an ID jaw dovetail of jaw holder 30 or vise 32 or to align the male dovetail of jaws 150 with female dovetail of EOAT 24 during engagement and disengagement Skilled persons will now appreciate that many changes may be made to the details of the above-described embodiments without departing from the underlying principles of the invention. The scope of the present invention should, therefore, be determined only by claims and equivalents.

The invention claimed is:

1. An end-of-arm-tool (EOAT) mechanical interface for operatively coupling a gripper actuator to a part-gripping device, the EOAT mechanical interface comprising:
first and second EOAT-to-gripper interface bodies moveable relative to each other along a gripping axis, each of the first and second EOAT-to-gripper interface bodies being mountable to, respectively, first and second portions of the gripper actuator that is configured to actuate the first and second EOAT-to-gripper interface bodies along the gripping axis;

a lateral restraint dovetail joint surface configured to contact and slide relative to a confronting lateral restraint dovetail joint surface of the part-gripping device in response to actuation of the first and second EOAT-to-gripper interface bodies, thereby pulling the part-gripping device inward toward the EOAT mechanical interface; and a matable alignment structure configured to limit a gripping axis distance that the gripper actuator opens when engaging the EOAT mechanical interface with the part-gripping device such that the lateral restraint dovetail joint surface becomes aligned for engagement with the confronting lateral restraint dovetail joint surface.

2. The EOAT mechanical interface of claim 1, further comprising a Z-axis locating structure matable with a confronting Z-axis locating structure of the part-gripping device.

3. The EOAT mechanical interface of claim 2, in which the Z-axis locating structure includes a Z-locating pocket.

4. The EOAT mechanical interface of claim 2, in which the Z-axis locating structure includes a Z-locating boss.

5. The EOAT mechanical interface of claim 1, in which the matable alignment structure includes an alignment pin.

6. The EOAT mechanical interface of claim 1, in which the matable alignment structure includes an alignment window.

7. The EOAT mechanical interface of claim 1, further comprising a female dovetail including the lateral restraint dovetail joint surface.

8. The EOAT mechanical interface of claim 1, further comprising a male dovetail including the lateral restraint dovetail joint surface.

9. The EOAT mechanical interface of claim 1, in which the first EOAT-to-gripper interface body includes the lateral restraint dovetail joint surface and the matable alignment structure, and in which the second EOAT-to-gripper interface body is a mirror image of the first EOAT-to-gripper interface body.

10. A part-gripping device mechanical interface for operatively coupling an end-of-arm-tool (EOAT) to a part-gripping device, the part-gripping device mechanical interface comprising:

first and second jaw bodies moveable relative to each other along a gripping axis, each of the first and second jaw bodies being mountable to, respectively, first and second EOAT mechanical interfaces of the EOAT;

a lateral restraint dovetail joint surface configured to contact and slide relative to a confronting lateral restraint dovetail joint surface in response to actuation of the first and second EOAT mechanical interfaces, thereby pulling the part-gripping device inward toward the EOAT; and a spring-actuated tensioner coupled to the first and second EOAT-to-gripper interface bodies and configured to maintain a securing force applied along the gripping axis to the lateral restraint dovetail joint surface.

11. The part-gripping device mechanical interface of claim 10, further comprising a Z-axis locating structure matable with a confronting Z-axis locating structure of the part-gripping device.

12. The part-gripping device mechanical interface of claim 11, in which the Z-axis locating structure includes a Z-locating pocket.

13. The part-gripping device mechanical interface of claim 11, in which the Z-axis locating structure includes a Z-locating boss.

14. The part-gripping device mechanical interface of claim 10, further comprising a matable alignment structure configured to limit a gripping axis distance that a gripper actuator opens when engaging the part-gripping device mechanical interface such that the lateral restraint dovetail joint surface becomes aligned with the confronting lateral restraint dovetail joint surface.

15. The part-gripping device mechanical interface of claim 14, in which the matable alignment structure includes an alignment pin.

16. The part-gripping device mechanical interface of claim 14, in which the matable alignment structure includes an alignment window.

17. The part-gripping device mechanical interface of claim 10, further comprising a female dovetail including the lateral restraint dovetail joint surface.

18. The part-gripping device mechanical interface of claim 10, further comprising a male dovetail including the lateral restraint dovetail joint surface.

19. The part-gripping device mechanical interface of claim 10, in which the second jaw body is a mirror image of the first jaw body.

20. A gripper finger for a robotic end-of-arm-tool (EOAT), comprising:

a finger segment including a slot and a fingertip mounting aperture in fluid communication with the slot, the slot having a length and the fingertip mounting aperture extending generally transverse to the length;

a fingertip having a boss sized to fit in the slot, the boss including a receptacle; and a shoulder bolt sized to extend into the fingertip mounting aperture and the receptacle to loosely couple the fingertip to the finger segment such that the fingertip is configured to rock back and forth relative to the finger segment.

21. A pair of gripper fingers according to claim 20, further comprising a part-gripping device mechanical interface for operatively coupling the EOAT to a part-gripping device, the part-gripping device mechanical interface comprising:

first and second jaw bodies moveable relative to each other along a gripping axis, each of the first and second jaw bodies being mountable to, respectively, first and second EOAT mechanical interfaces of the EOAT;

a lateral restraint dovetail joint surface configured to contact and slide relative to a confronting lateral restraint dovetail joint surface in response to actuation of the first and second EOAT mechanical interfaces, thereby pulling the part-gripping device inward toward the EOAT; and a spring-actuated tensioner coupled to the first and second EOAT-to-gripper interface bodies and configured to maintain a securing force applied along the gripping axis to the lateral restraint dovetail joint surface.

22. The pair of gripper finger of claim 21, further comprising a second interface for a jaw storage plate, the second interface being on a side of the pair of gripper fingers that is perpendicular to that of the part-gripping device mechanical interface.

23. The gripper finger of claim 20, in which the finger segment is a laterally adjustable finger segment, the gripper finger further comprising a set screw to set a lateral adjustment position.

* * * * *